United States Patent
Larsen et al.

(10) Patent No.: US 8,322,928 B2
(45) Date of Patent: Dec. 4, 2012

(54) PITCH BEARING FOR WIND TURBINE ROTOR BLADES

(75) Inventors: Martin Hedegaard Larsen, Herning (DK); Anders Vangsgaard Nielsen, Silkeborg (DK); Steffen Frydendal Poulsen, Silkeborg (DK)

(73) Assignee: Siemens Aktiengesellschaft, München (DE)

( * ) Notice: Subject to any disclaimer, the term of this patent is extended or adjusted under 35 U.S.C. 154(b) by 957 days.

(21) Appl. No.: 12/286,674

(22) Filed: Oct. 1, 2008

(65) Prior Publication Data

US 2009/0087127 A1  Apr. 2, 2009

Related U.S. Application Data

(60) Provisional application No. 60/976,560, filed on Oct. 1, 2007.

(51) Int. Cl.
*F16C 33/00* (2006.01)
*F03D 11/00* (2006.01)

(52) U.S. Cl. ....... 384/129; 290/55; 416/220 R; 416/226; 416/131; 416/132 B; 348/512; 348/515

(58) Field of Classification Search .............. 416/220 R, 416/226, 131, 132 B
See application file for complete search history.

(56) References Cited

U.S. PATENT DOCUMENTS

| 4,668,109 | A  | * | 5/1987 | Basso | 384/518 |
| 7,927,019 | B2 | * | 4/2011 | Yoshida et al. | 384/512 |
| 2004/0134161 | A1 | * | 7/2004 | Lockwood et al. | 52/736.1 |
| 2006/0196878 | A1 | * | 9/2006 | Cook | 220/639 |
| 2008/0213095 | A1 | * | 9/2008 | Bech et al. | 416/131 |

FOREIGN PATENT DOCUMENTS

| CN | 101617120 A | 12/2009 |
| EP | 1887237 A1 | 2/2008 |
| WO | WO 2006129351 A1 | 12/2006 |
| WO | WO 2007003866 A1 | 1/2007 |

OTHER PUBLICATIONS

Communication from Chinese Patent Office listing cited reference, received Dec. 26, 2011, pp. 4, 1-3.
1 Communication From European Patent Office, Apr. 18, 2012, pp. 1-7.

* cited by examiner

*Primary Examiner* — Cheung Lee
*Assistant Examiner* — David Spalla

(57) ABSTRACT

A pitch bearing for a wind turbine rotor comprises a rotor hub and at least one rotor blade, the pitch bearing comprising a cylindrical inner bearing ring connectable to a rotor blade of the wind turbine rotor, a cylindrical outer bearing ring connectable to the rotor hub of the wind turbine rotor and an annular reinforcement section for reinforcing the outer bearing ring. The annular reinforcement section adjoins the cylindrical outer bearing ring at its radial outer surface.

13 Claims, 5 Drawing Sheets

PITCH BEARING FOR WIND TURBINE ROTOR BLADES

CROSS REFERENCE TO RELATED APPLICATIONS

This application claims the benefits of U.S. Provisional application No. 60/976,560 filed Oct. 1, 2007 and is incorporated by reference herein in is entirety.

FIELD OF INVENTION

The present invention relates to a pitch bearing for wind turbine rotor blades with an inner bearing ring connectable to a rotor blade of a wind turbine rotor and an outer bearing ring connectable to a rotor hub of a wind turbine rotor. In addition, the invention relates to a wind turbine with at least one such pitch bearing.

BACKGROUND OF THE INVENTION

In modern wind turbines the rotor blades are mounted to the hub via pitch bearings which allow for controlling the loads acting on the blades by changing the pitch of the blades relative to the wind. Those bearings usually comprise a cylindrical inner bearing ring to which the rotor blade is fixed and a cylindrical outer bearing ring which is fixed to the rotor hub. Between both bearing rings one or more rows of rolling elements are present which allow the outer ring and the inner ring to be rotated relative to each other.

When bearings with more than one row of rolling elements are used the load can become unevenly distributed between the rows, especially in strong winds when the wind forces act to substantially bend the blades. This bending also has the effect of deforming the outer ring of the pitch bearing in such a way that the load on some of the rolling elements is further reduced leaving the rest of the rolling elements to carry a larger load. Hence, parts of the bearing carry a larger load than intended, leading to a shortened lifetime compared to the designed lifetime.

In some of the blade bearing designs the uneven sharing between the rows are not taken into account. Instead it is assumed that the sharing is exactly evenly distributed which leads to a non-conservative design. One way to solve the issue of unevenly distributed loads would be to make the bearing larger. However, this would add weight and cost to the design.

Another way to obtain more load bearing capacity would be using larger bearing balls. The drawback of using larger bearing balls would be that this will require a higher bearing and thereby a more flexible bearing. As a consequence, it will become more difficult to obtain the required stiffness of the bearing.

A further way of resolving the issue of unevenly distributed loads is described in WO 2007/003866 A1. In this document it is described to mount a reinforcement ring to the axial outer end of the cylindrical outer bearing ring.

SUMMARY OF INVENTION

With respect to this prior art it is an objective of the present invention to provide a pitch bearing with an alternative design for an annular reinforcement section for reinforcing the outer bearing ring. It is a further objective of the present invention to provide an advantageous wind turbine.

The first objective is solved by a pitch bearing according to the claims. The further objective is solved by a wind turbine according to the claims.

In a first aspect of the invention, the inventive pitch bearing for a wind turbine rotor with a rotor hub and at least one rotor blade comprises a cylindrical inner bearing ring connectable to a rotor blade of the wind turbine rotor, a cylindrical outer bearing ring connectable to the rotor hub of the wind turbine rotor, and an annular reinforcement section for reinforcing the outer bearing ring. In the inventive pitch bearing, the annular reinforcement section adjoins the cylindrical outer bearing ring at its radial outer wall.

The invention is based on the following observation: The forces resulting from the loads act in radial direction of the outer bearing ring. The strength of these forces vary depending on the axial location of the bearing ring with the forces being highest at the bearing ring's axial outer end. If the reinforcement section adjoins the axial outer end of the ring as, for example, in WO 2007/003866 A1, it may happen that the radial force acting on the reinforcement section is higher than the radial force acting on the axial outer end of the bearing ring. This may lead to loads acting on the joint between the reinforcement section and the bearing outer ring which could weaken the joint over time.

On the other hand, if the reinforcement section adjoins the cylindrical outer bearing ring at its radial outer surface its axial location corresponds to the axial location of the outer bearing ring on which the radial forces act. Hence, the loads acting on the outer bearing ring are the same as the loads acting on the reinforcement section.

In particular, the reinforcement section may be formed by an increased wall thickness of the outer bearing ring in a ring portion adjoining the outer bearing's axial outer end towards its axial inner end so that the reinforcement is an integral part of the bearing ring without any joint.

As the radial forces acting on the outer bearing ring decrease from the bearing ring's axial outer end towards its axial inner end the wall thickness of the outer bearing ring may also decrease from its axial outer end towards its axial inner end. The decrease may, in particular, be continuous. The wall thickness of the outer bearing ring may be constant in a ring portion extending from the outer bearing ring's axial inner end to about the axial middle of the outer bearing ring.

In a second design of the inventive pitch bearing for a wind turbine rotor with a rotor hub and at least one rotor blade the pitch bearing comprises a cylindrical inner bearing ring connectable to a rotor blade of the wind turbine rotor, a cylindrical outer bearing ring connectable to a rotor hub of the wind turbine rotor, and an annular reinforcement section for reinforcing the outer bearing ring. In this design the reinforcement section consists of at least two separate ring segments which are adapted to be joined together and to be joined to the outer bearing ring. In particular, the at least two separate ring segments may be adapted to be releasably joined together and/or releasably joined to the outer bearing ring. This allows for providing different ring segments which may be joined together and to the outer bearing ring so that by combining different kinds of segments the reinforcement can be adapted to the actual needs of the pitch bearing. In particular, the at least two separate ring segments may be adapted to be releasably joined together and/or to the outer bearing ring by bolting.

Although the at least two separate ring segments can be joined to the outer bearing ring at its axial outer end it is advantageous for the reasons discussed above if the at least two separate ring segments adjoin the radial outer surface of the cylindrical outer bearing ring.

An inventive wind turbine comprises a rotor with at least one inventive pitch bearing. The inventive wind turbine achieves the advantages discussed above with respect to the inventive pitch bearing.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

Figure 1:
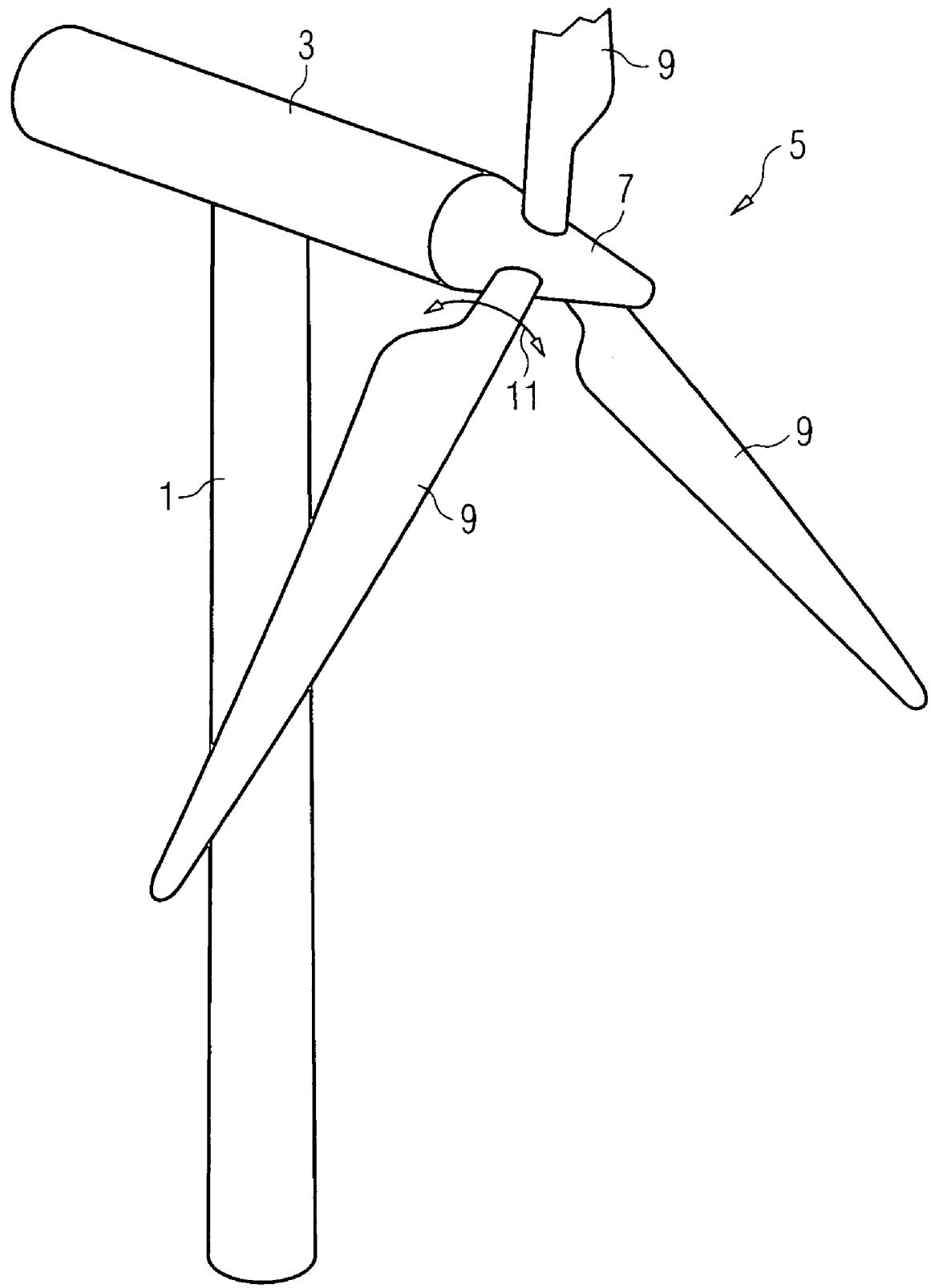
FIG. 1 shows a wind turbine.

A wind turbine with an inventive pitch bearing is shown in FIG. 1. The wind turbine comprises a tower 1, a nacelle 3 which is mounted pivotably about the tower axis at the tower top and which houses the generator of the wind turbine, and a rotor 5 which is rotatably connected to the generator inside the nacelle. The rotor 5 comprises a rotor hub 7 and, in the pre-sent embodiment, three rotor blades 9 which are mounted to the rotor hub so as to be rotatable about a pitch axis, as indicated for one of the blades 9 by the arrow 11.

Although the wind turbine shown in FIG. 1 is equipped with three rotor blades, the rotor may have a different number of blades, for example only two blades. In general, any number of blades would be possible, although two-bladed rotors and, in particular, three-bladed rotors are the most common.

Figure 2:
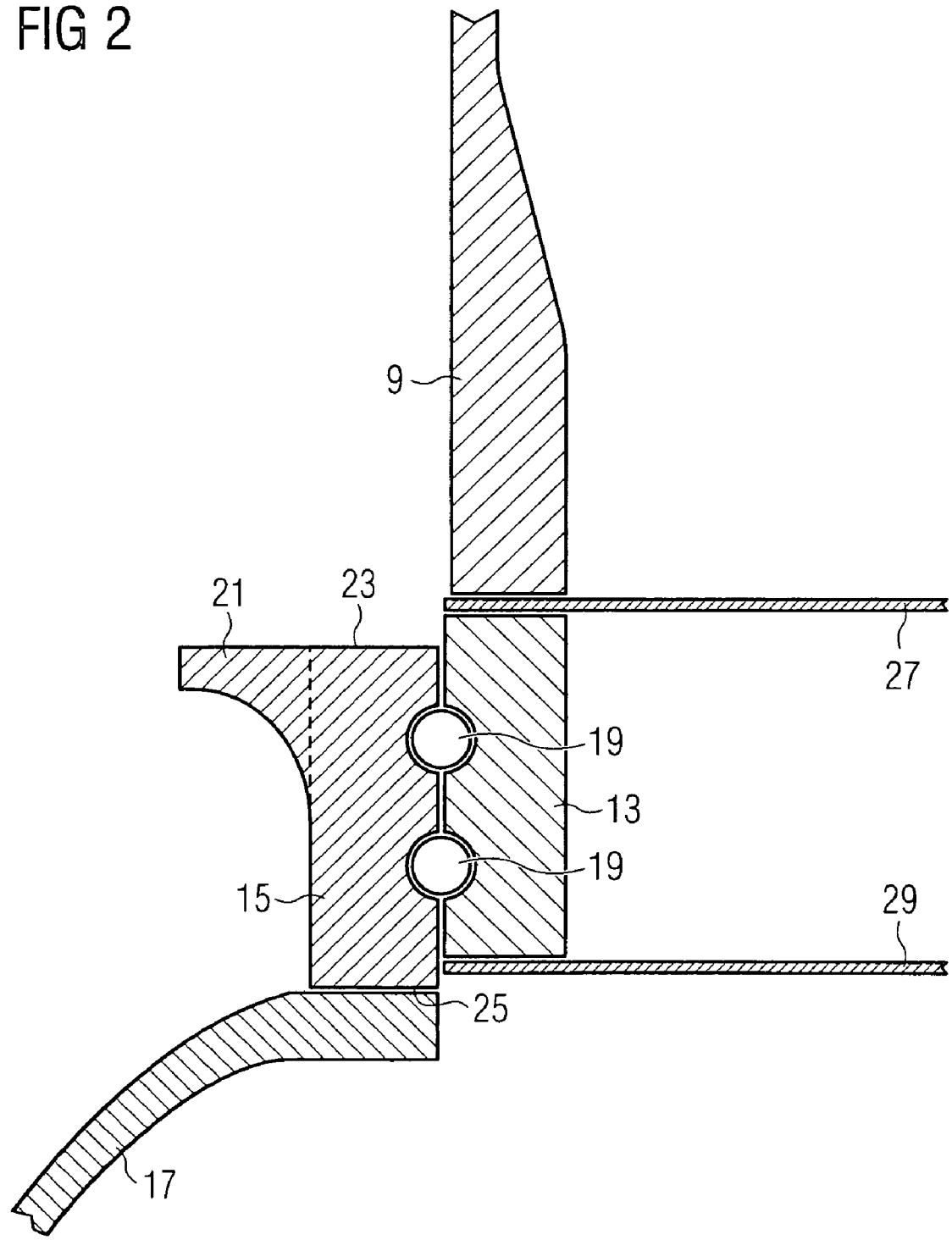
FIG. 2 shows a first embodiment of the wind turbine's pitch bearing.

The wind turbine rotor blades 9 are mounted to the rotor hub 7 by use of pitch bearings. A first embodiment of a pitch bearing usable in the wind turbine shown in FIG. 1 is shown in FIG. 2. The pitch bearing comprises an inner bearing ring 13 to which the rotor blade 9 (of which only a wall segment is shown in FIG. 2) is fixed, and an outer bearing ring 15 which is mounted to a base element 17 of the rotor hub 7. The inner bearing ring 13 and the outer bearing ring 15 each comprise two rows of races between which rolling elements are located so as to allow easy rotation of the cylindrical inner bearing ring 13 and the cylindrical outer bearing ring 15 relative to each other. In the present embodiment, the rolling elements 19 are balls 19.

If there are strong winds acting on the rotor blades, the rotor blades 9 tend to bend. This bending tends to deform the outer bearing ring 15 of the pitch bearing in such a way that the load on the upper balls 19 in the figure is increased and the load on the lower balls 19 in the figure is decreased. In order to reduce such a deformation of the outer bearing ring 15 the outer bearing ring is reinforced by adding material to the usually cylindrical shape of the outer bearing ring 15. The material is added to the outer surface of a usual cylindrical outer bearing ring, which is indicated by the dashed line in FIG. 2. The added material increases the thickness (wall thickness) of a ring portion of the outer bearing ring 15 as indicated by reference numeral 21. The wall thickness of this ring portion 21 is the thickest at the axial outer end 23 of the bearing ring 15 and decreases continuously towards its axial inner end. From about the middle of the bearing ring 15 the wall thickness is constant until the axial inner end 25.

Not only the outer bearing ring 15 is reinforced but also the inner bearing ring 13. This is done by closing the cylindrical bearing ring 13 by reinforcing plates 27, 29 at the cylindrical bearing ring's axial ends.

Figure 3:
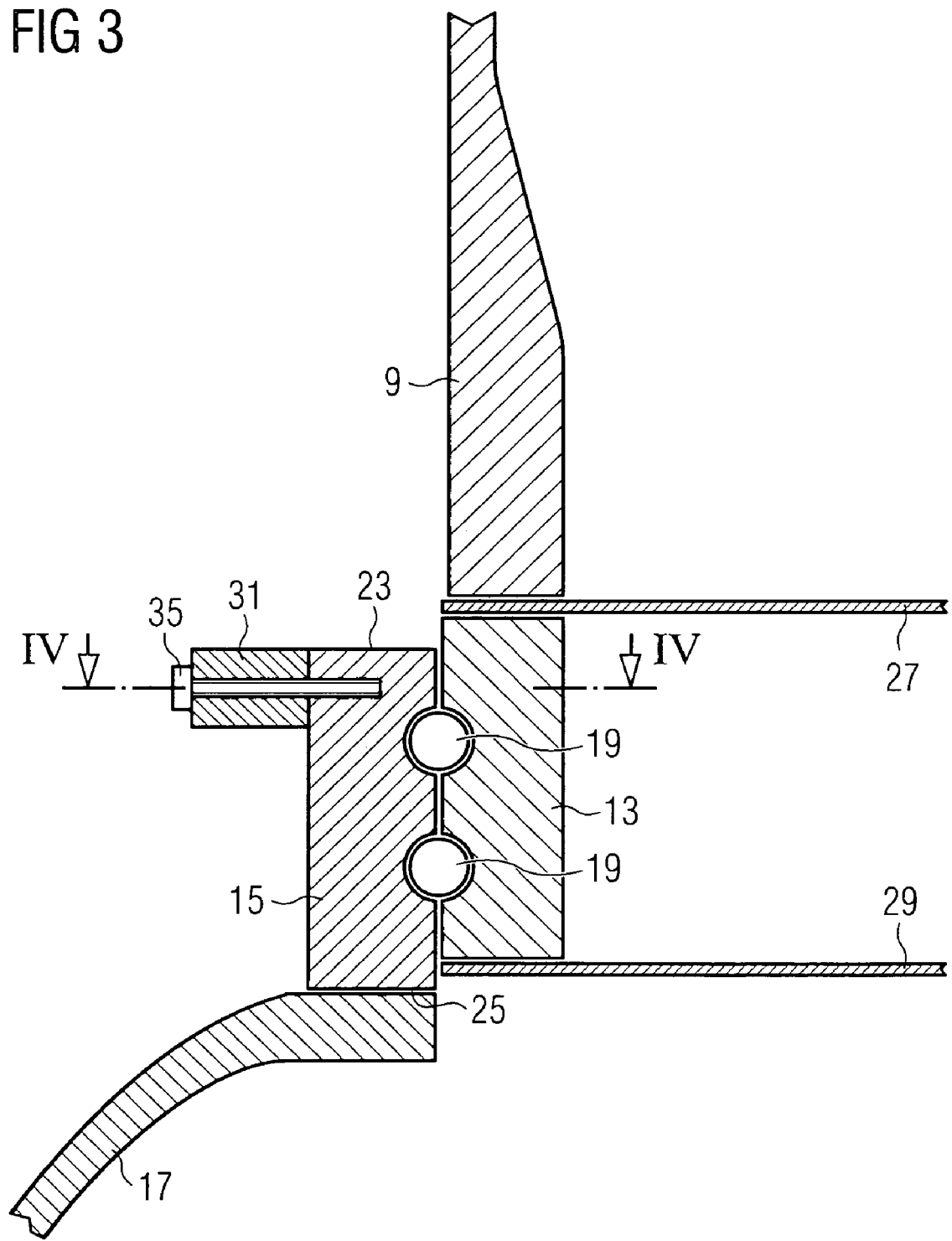
FIG. 3 shows a second embodiment of the wind turbine's pitch bearing.
Figure 4:
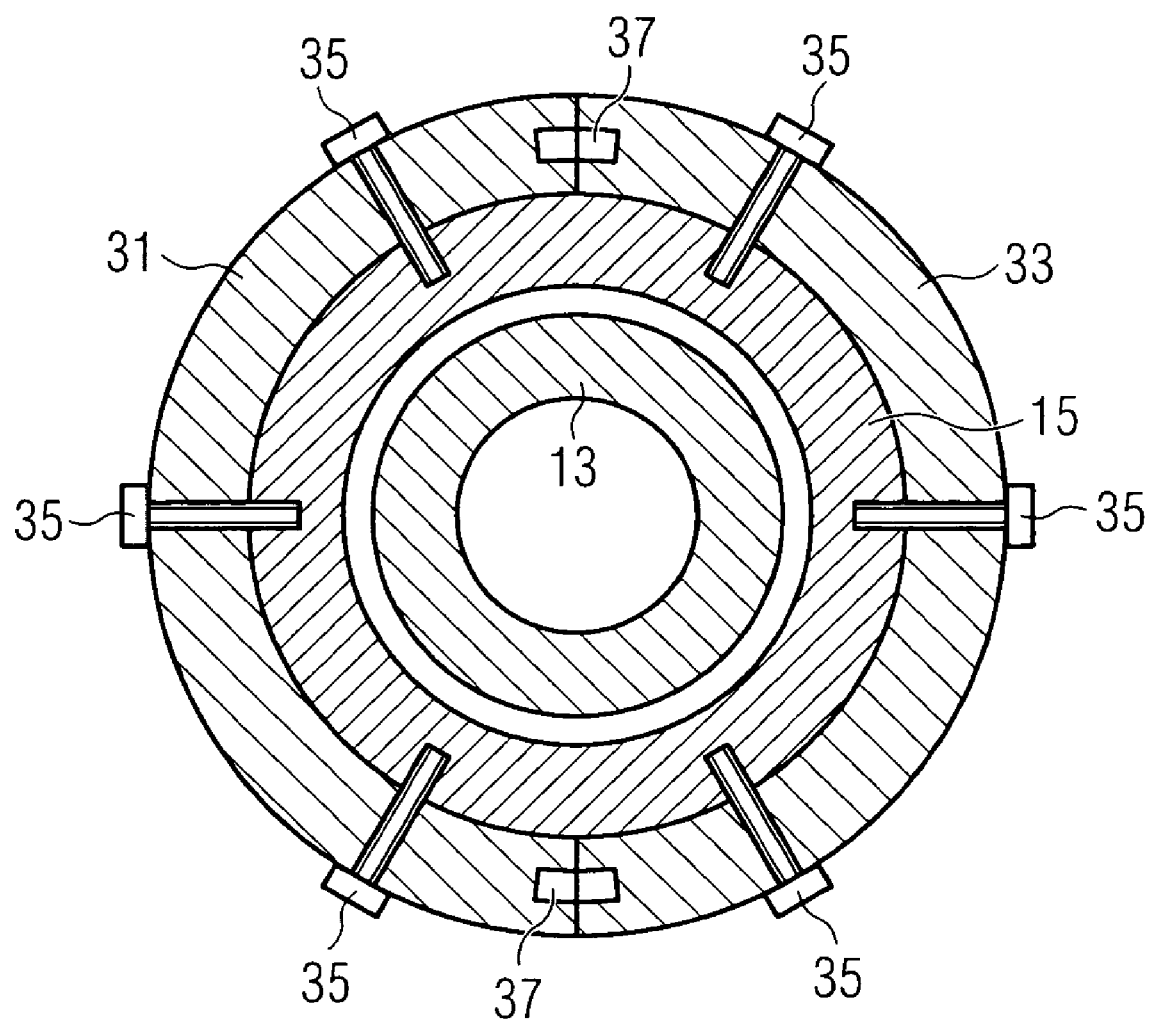
FIG. 4 shows a section through the pitch bearing shown in FIG. 3 along the line IV-IV.

A second embodiment of the inventive pitch bearing is shown in FIG. 3. This embodiment differs from the first embodiment shown in FIG. 2 in that the reinforcing of the outer bearing ring 15 is done by two semiannular reinforcing elements 31, 33 which are bolted to the outer bearing ring 15 by means of screws 35 extending through the reinforcing elements 31, 33 into the cylindrical outer bearing ring 15 (see also FIG. 4). In addition, both semiannular reinforcing elements 31, 33 are joined together by bolts 37. Please note that although two semiannular reinforcing elements 31, 33 are present in the embodiment shown in FIG. 3 the number of reinforcing elements can be more than two, for example three or four, with each element representing one third or one fourth of a full annular element.

Figure 5:
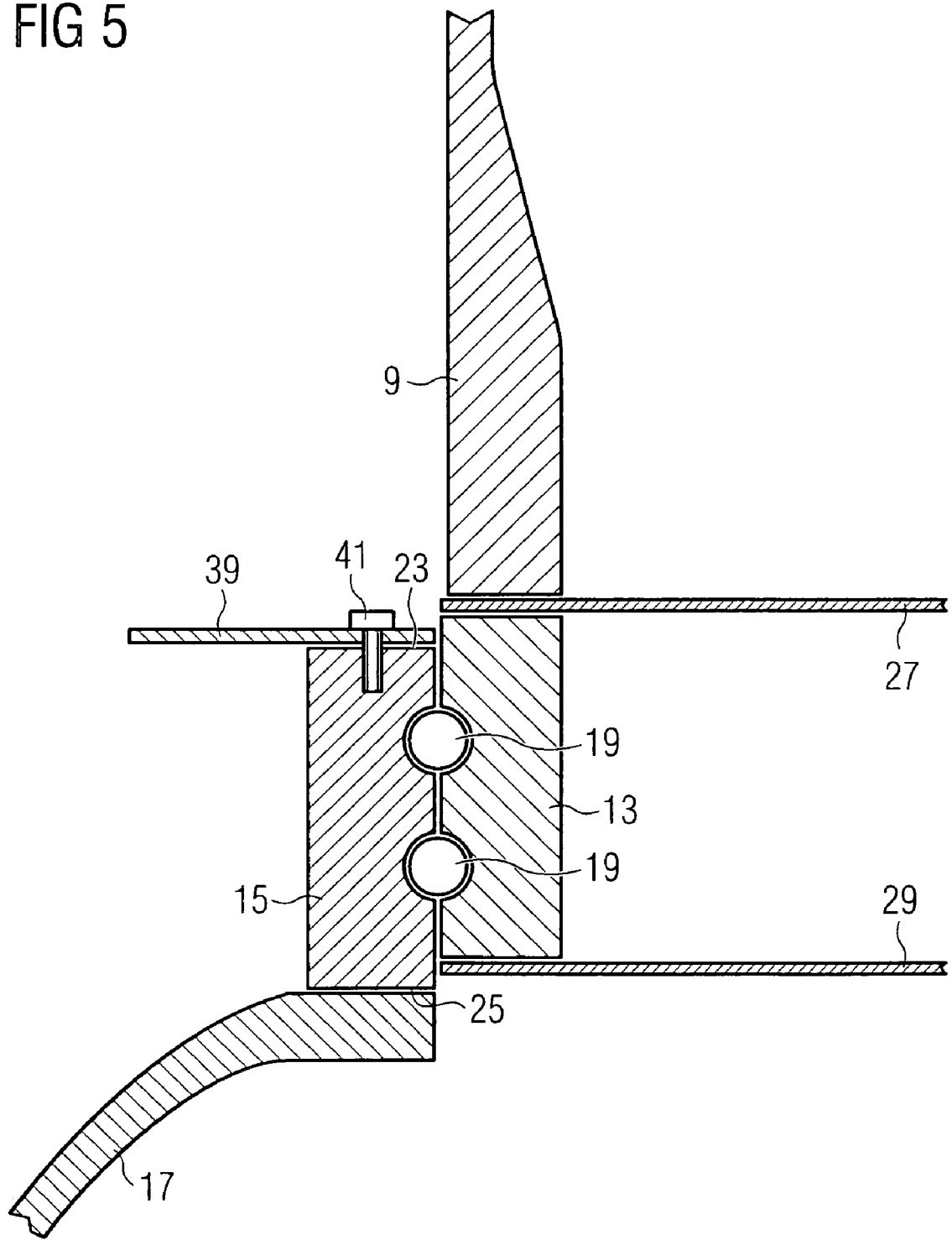
FIG. 5 shows a third embodiment of the inventive pitch bearing.

A third embodiment of the inventive pitch bearing is shown in FIG. 5. In this embodiment, semiannular reinforcing plates 39 are bolted to the radial outer end 23 of the outer bearing ring 15 by means of screws 41. Like in the second embodiment, the number of reinforcing elements, i.e. reinforcing plates 39, can be more than two, with each reinforcing plate forming a respective fraction of a full annular reinforcing plate.

Providing the reinforcing elements 31, 33, 39 in the second and third embodiments of the inventive pitch bearing simplifies mounting of the reinforcing elements to the outer bearing ring 15. In particular the reinforcing elements 31, 33, 39 can be mounted to the outer bearing ring while a rotor blade is fixed to the inner bearing ring. This would not be possible with a single full annular reinforcing element.

The reinforcing elements shown in the present embodiments provide additional, uniform rigidity to the outer bearing ring at its location closest to the rotor blade. While this is done in the first embodiment by locally increasing the wall thickness of the outer bearing ring, separate reinforcing elements which are fixed to the outer bearing ring are used in the second and third embodiments. Note, that in all embodiments the resulting reinforcing is of annular shape and covers the entire circumference of the outer reinforcing ring. This has two advantages, namely that the bearing will be reinforced at the entire circumference in relation to deformations of companion structures, and that the bearing will be reinforced in a similar way for the entire range of different blade pitch angles and different bending moment axis. As a result, a more uniform sharing of ball forces between upper and lower ball races (ball tracks) on a double-rowed ball bearing used as a blade bearing for a wind turbine, can be secured. A more uniform sharing has a big impact on the lifetime of the ball races. It is common that the combination of large ball forces combined with rolling (blade pitching) leads to fatigue of the ball races. With reducing the ball forces by better sharing will result in significantly lower fatigue on the ball races. In addition, relative large deformations of the blade bearing outer ring can be prevented. Thereby, fatigue of the outer ring structure can be pre-vented as well. Fatigue of the outer ring structure is a common issue in blade bearings for wind turbines.

The invention claimed is:

1. A pitch bearing for a wind turbine rotor having a rotor hub and at least one rotor blade, comprising:
 a cylindrical inner bearing ring connectable to a rotor blade of the wind turbine rotor;
 a cylindrical outer bearing ring connectable to the rotor hub of the wind turbine rotor; and an annular reinforcement section that adjoins to the cylindrical outer bearing ring at its radial outer surface such that at least a portion of the wall thickness of the outer bearing ring is increased, wherein the wall thickness of the outer bearing ring decreases continually from the axial outer end, or from a portion of constant wall thickness that is located at the axial outer end, towards the axial inner end of the outer bearing ring, the decrease of the wall thickness relative to the decrease of the radial forces from the axial outer end towards the axial inner end.

2. The pitch bearing as claimed in claim 1, wherein the reinforcement section is formed by an increased wall thickness of the outer bearing ring in a ring portion adjoining the outer bearing's axial outer end towards the outer bearing's axial inner end.

3. The pitch bearing as claimed in claim 1, wherein the wall thickness of the outer bearing ring decreases continuously from the portion of constant wall thickness that is located at the axial outer end to the axial middle of the outer bearing ring.

4. A wind turbine comprising a rotor comprising:
a rotor arranged along a rotational axis of the turbine;
a plurality of blades arranged circumferentially around the rotor; and
at least one pitch bearing according to claim 1.

5. The wind turbine as claimed in claim 4, wherein the reinforcement section is formed by an increased wall thickness of the outer bearing ring in a ring portion adjoining the outer bearing's axial outer end towards the outer bearing's axial inner end.

6. The wind turbine as claimed in claim 4, wherein the wall thickness of the outer bearing ring decreases continuously from the axial outer end towards the axial inner end of the outer bearing ring.

7. The wind turbine as claimed in claim 6, wherein a wall thickness of the outer bearing ring is constant in a ring portion extending from the outer bearing ring's axial inner end to an axial middle of the outer bearing ring.

8. A pitch bearing for a wind turbine rotor with a rotor hub and at least one rotor blade, comprising:
a cylindrical inner bearing ring connectable to a rotor blade of the wind turbine rotor;
a cylindrical outer bearing ring connectable to the rotor hub of the wind turbine rotor; and
an annular reinforcement section that adjoins to the cylindrical outer bearing ring at its radial outer surface such that at least a portion of the wall thickness of the outer bearing ring is increased in the radial direction, the annular reinforcement section comprising at least two separate ring segments joined together via a connector inside the adjoining ring segments, the connector arranged tangentially in relation to the adjoining ring segments, and the annular reinforcement section joined to the outer bearing ring via a radial connection.

9. The pitch bearing as claimed in claim 8, wherein the at least two separate ring segments are releasably joined together.

10. The pitch bearing as claimed in claim 9, wherein the at least two separate ring segments are releasably joined together by bolting.

11. The pitch bearing as claimed in claim 10, wherein the at least two separate ring segments adjoin the radial outer surface of the cylindrical outer bearing ring.

12. The pitch bearing as claimed in claim 8, wherein the at least two separate ring segments are releasably joined to the outer bearing ring.

13. The pitch bearing as claimed in claim 8, wherein the annular reinforcement section does not extend below a top most rolling element relative to an axial outer end of the outer bearing ring.

\* \* \* \* \*